US009286285B1

(12) United States Patent
Vagell et al.

(10) Patent No.: US 9,286,285 B1
(45) Date of Patent: Mar. 15, 2016

(54) FORMULA EDITOR

(71) Applicant: Google Inc., Mountain View, CA (US)

(72) Inventors: Vance J. Vagell, Kew Gardens, NY (US); Shoshana Holtzblatt, New York, NY (US); Varnali Shah, Jersey City, NJ (US)

(73) Assignee: GOOGLE INC., Mountain View, CA (US)

( * ) Notice: Subject to any disclaimer, the term of this patent is extended or adjusted under 35 U.S.C. 154(b) by 671 days.

(21) Appl. No.: 13/663,670

(22) Filed: Oct. 30, 2012

(51) Int. Cl.
*G06F 17/00* (2006.01)
*G06F 17/24* (2006.01)

(52) U.S. Cl.
CPC .................... *G06F 17/246* (2013.01)

(58) Field of Classification Search
CPC ........................................... G06F 17/246
See application file for complete search history.

(56) References Cited

U.S. PATENT DOCUMENTS

| | | | |
|---|---|---|---|
| 5,307,484 A | | 4/1994 | Baker et al. |
| 5,345,516 A | * | 9/1994 | Boyer et al. .................. 382/113 |
| 5,416,895 A | | 5/1995 | Anderson et al. |
| 5,600,584 A | * | 2/1997 | Schlafly .................. 708/551 |
| 5,603,021 A | * | 2/1997 | Spencer et al. |
| 5,706,449 A | | 1/1998 | Liu et al. |
| 5,809,317 A | | 9/1998 | Kogan et al. |
| 5,842,180 A | * | 11/1998 | Khanna .................. G06Q 40/12 705/30 |
| 5,910,802 A | | 6/1999 | Shields et al. |
| 5,950,168 A | | 9/1999 | Simborg et al. |
| 6,055,550 A | | 4/2000 | Wallack |
| 6,204,846 B1 | | 3/2001 | Little et al. |
| 6,205,453 B1 | | 3/2001 | Tucker et al. |
| 6,317,758 B1 | | 11/2001 | Madsen et al. |
| 6,430,574 B1 | | 8/2002 | Stead |
| 6,437,812 B1 | | 8/2002 | Giles et al. |
| 6,711,715 B1 | | 3/2004 | Grealish |
| 6,734,883 B1 | | 5/2004 | Wynn et al. |
| 6,738,084 B1 | | 5/2004 | Kelley et al. |
| 6,778,192 B2 | | 8/2004 | Arbab et al. |
| 6,828,988 B2 | * | 12/2004 | Hudson et al. ................. 715/711 |
| 6,978,443 B2 | * | 12/2005 | Flanagan .................. G06F 8/75 706/47 |
| 6,988,241 B1 | * | 1/2006 | Guttman ............... G06F 17/246 707/E17.115 |
| 7,009,609 B2 | | 3/2006 | Miyadai |
| 7,101,779 B2 | * | 9/2006 | Vaartstra et al. .............. 438/597 |
| 7,117,430 B2 | | 10/2006 | Maguire, III et al. |
| 7,117,450 B1 | | 10/2006 | Chaudhri |
| 7,266,763 B2 | | 9/2007 | Peyton-Jones et al. |

(Continued)

OTHER PUBLICATIONS

Clark, iWork'09: The Missing Manual, O'Reilly Media, Inc., Apr. 24, 2009, Chapter 20, "Using Formulas", 44 pages.*

(Continued)

*Primary Examiner* — Amelia Tapp
(74) *Attorney, Agent, or Firm* — Young Basile Hanlon & MacFarlane P.C.

(57) ABSTRACT

A computer-implemented method for editing a formula includes receiving a text string including formula information. The method further includes parsing the received text string and analyzing the parsed text string for a formula and formula errors while the text string is being received. In response to a formula error being detected in the analyzed text string, the method can include generating a message pertaining to the formula error. In response to a formula detected in the analyzed text string, the method can include calculating at least one sub-value for the formula and generating a message pertaining to the at least one sub-value of the formula.

19 Claims, 7 Drawing Sheets

(56) References Cited

U.S. PATENT DOCUMENTS

| | | |
|---|---|---|
| 7,275,207 B2 | 9/2007 | Aureglia et al. |
| 7,546,523 B2 | 6/2009 | Aureglia et al. |
| 7,752,148 B2 * | 7/2010 | Yu et al. .................. 706/12 |
| 8,130,205 B2 | 3/2012 | Forstall et al. |
| 2002/0023105 A1 | 2/2002 | Wisniewski |
| 2002/0143809 A1 | 10/2002 | Bennett |
| 2002/0169799 A1 | 11/2002 | Voshell |
| 2002/0186252 A1 | 12/2002 | Himmel et al. |
| 2002/0194095 A1 | 12/2002 | Koren |
| 2003/0188257 A1 | 10/2003 | Aureglia et al. |
| 2003/0226105 A1 | 12/2003 | Waldau |
| 2004/0107277 A1 | 6/2004 | Levesque et al. |
| 2005/0091604 A1 | 4/2005 | Davis |
| 2005/0183017 A1 | 8/2005 | Cain |
| 2005/0210403 A1 | 9/2005 | Satanek |
| 2006/0036939 A1 | 2/2006 | Hobbs et al. |
| 2006/0070002 A1 | 3/2006 | Guido et al. |
| 2006/0107226 A1 | 5/2006 | Matthews et al. |
| 2006/0117051 A1 | 6/2006 | Chin |
| 2006/0184901 A1 | 8/2006 | Dietz |
| 2006/0224946 A1 | 10/2006 | Barrett et al. |
| 2007/0016872 A1 | 1/2007 | Cummins et al. |
| 2007/0033518 A1 | 2/2007 | Kenna et al. |
| 2007/0083541 A1 | 4/2007 | Fraleigh et al. |
| 2007/0130503 A1 | 6/2007 | Voshell |
| 2007/0153897 A1 | 7/2007 | Yan |
| 2007/0234195 A1 | 10/2007 | Wells |
| 2008/0028340 A1 | 1/2008 | Davis |
| 2008/0155464 A1 | 6/2008 | Jones et al. |
| 2008/0229184 A1 | 9/2008 | Prish et al. |
| 2008/0238938 A1 | 10/2008 | Eklund et al. |
| 2009/0158139 A1 | 6/2009 | Morris et al. |
| 2009/0187816 A1 | 7/2009 | Aureglia et al. |
| 2009/0287673 A1 | 11/2009 | Chronister et al. |
| 2009/0325607 A1 | 12/2009 | Conway et al. |
| 2011/0148789 A1 | 6/2011 | Kim et al. |
| 2011/0283227 A1 | 11/2011 | Moore et al. |

OTHER PUBLICATIONS

Abraham et al. ("Abraham"), "How to Communicate Unit Error Messages in Spreadsheets", First Workshop on EndUser Software Engineering (WEUSE I), May 21, 2005, Saint Louis, Missouri, USA, p. 1-5.*

Auto-Hide the Taskbar in Windows XP, Apr. 12, 2006, 3 pages, http://www.xp-tips.com/auto-hide-taskbar-.html.

Bankoski et al. "VP8 Data Format and Decoding Guide; draft-bankoski-vp8-bitstream-02" Network Working Group. Internet-Draft, May 18, 2011, 288 pp.

Doing it Right: skipping the iPhone url bar, Aug. 5, 2010, 4 pages, http://remysharp.com/2010/08/05/doing-it-right-skipping-the-iphone-url-bar.

Mozilla, "Introduction to Video Coding Part 1: Transform Coding", Video Compression Overview, Mar. 2012, 171 pp.

Product Feature Tour, Visual Studio Style, Auto Hide Control Bars, Mar. 9, 2004, 2 pages, http://www.bcgsoft.com/featuretour/tour156.htm.

Teknomo, K. "How to use MS Excel Iterations", 2006, pp. 1-5.

Pearson, "The Indirect Function", 1999, pp. 1-2.

Actuarial Outpost, Discussion Forum "Excel: Conditional Tab Colors," http://www.actuarialoutpost.com/actuarial_discussion_forum/showthread.php?t=220776, Jul. 2011. 5 Pages.

David Pogue, "iPhone: The Missing Manual, Forth Edition," Aug. 2010, 450 pages.

Microsoft Excel 2003-2013, "Named Ranges in Excel" 5 pages.

Microsoft Excell 2003, "Creating Custom functions" 6 pages.

Wayne Pan, "JavaScript Pull to Refresh," Jul. 2010, 3 pages.

StackOverflow, "Are there such things as variables within an Excel formula?" 2009, 3 pages.

* cited by examiner

FORMULA EDITOR

BACKGROUND

A spreadsheet is an example application that captures, analyzes, and shares tabular data sets. One example spreadsheet 100 is shown in FIG. 1. The spreadsheet 100 can display multiple cells (104) in a two-dimensional matrix or grid consisting of rows (106) and columns (108). Each cell (104) can receive and display a text string containing alphanumeric text, numeric values, or a formula. A formula can include both text and numeric values and can be designed to instruct the spreadsheet to perform a calculation, display the current date or time, or retrieve external data such as a stock quote or a database value. Other applications can also be used to capture, analyze, and share data sets using text strings, numeric values, and formulas.

SUMMARY

This disclosure relates to methods for editing a formula.

One aspect of the disclosed embodiments is a computer-implemented method for editing a formula. The method includes receiving a text string including formula information. The method further includes parsing the received text string and analyzing the parsed text string for formula errors while the text string is being received. In response to a formula error being detected in the analyzed text string, the method further includes generating a message pertaining to the formula error.

Another aspect of the disclosed embodiments is a computer-implemented method for editing a formula. The method includes receiving a text string including formula information. The method further includes parsing the received text string and analyzing the parsed text string for a formula while the text string is being received. In response to a formula being detected in the analyzed text string, the method further includes calculating at least one sub-value for the formula and generating a message pertaining to the at least one sub-value.

Another aspect of the disclosed embodiments is a computer-readable medium having processor-executable program instructions adapted to be executed to implement a method for editing a formula. The method includes receiving a text string including formula information. The method further includes parsing the received text string and analyzing the parsed text string for a formula while the text string is being received. In response to a formula being detected in the analyzed text string, the method further includes calculating at least one sub-value for the formula and generating a message pertaining to the at least one sub-value.

BRIEF DESCRIPTION OF THE DRAWINGS

The detailed description makes reference to the accompanying drawings wherein like reference numerals refer to like parts throughout the several views, and wherein.

DETAILED DESCRIPTION

In the methods described here, an input device receives a text string including formula information. The text string received by the input device is displayed. While the text string is being received, a formula analyzer parses the text string and analyzes the parsed text string for a formula and for formula errors. When a formula error is detected in the analyzed text string, a message pertaining to the formula error is generated and displayed. When a formula is detected in the analyzed text string, a formula calculator calculates at least one sub-value in the formula. A message pertaining to at least one sub-value is also generated and displayed.

Figure 1:
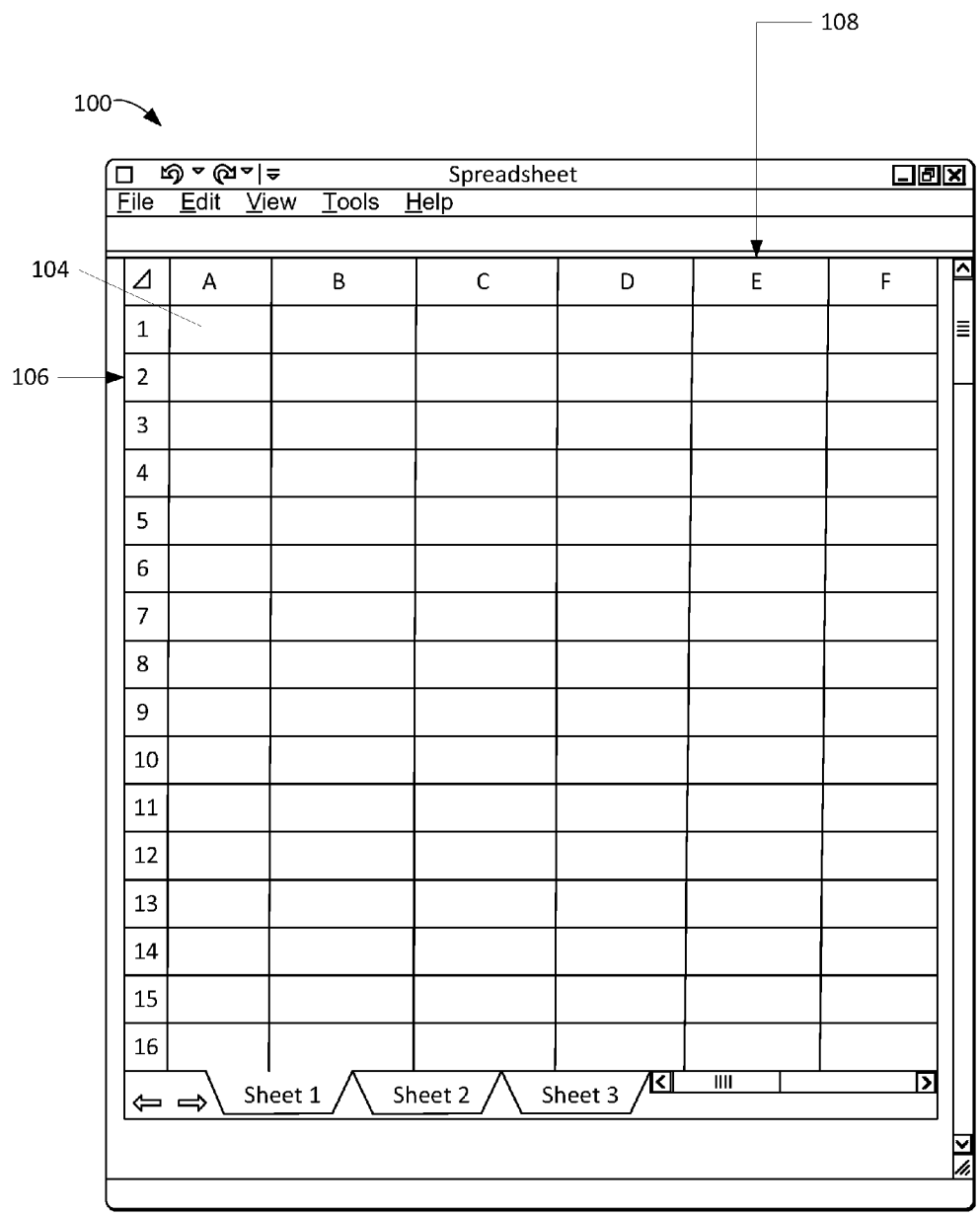
FIG. 1 is an example spreadsheet in which methods for editing a formula can be employed in accordance with one or more implementations described herein.

As described above, FIG. 1 is an example spreadsheet 100 capable of capturing, analyzing, and sharing tabular data sets. A text string, number, or series of numbers can be received in a cell 104 of the spreadsheet 100. Alternatively, a cell 104 can receive a formula, the formula being capable of performing a calculation using various text strings or numbers, of displaying the current date or time, or of retrieving external data such as a stock quote or a database value.

When dealing with long, complicated formulas with many sub-parts, sub-portions, terms, or sub-values, editing and displaying results of the formula in a spreadsheet 100 can be difficult. This is especially the case for formulas that refer to other data in calculating a result. Automatic calculation of a formula after entering or editing a text string eliminates the need to manually request the spreadsheet program to calculate a result. However, conventional approaches require a user to exit the cell 104 so that the result of the formula in the cell 104 is calculated and displayed to the user.

A user editing a formula can enter part of the formula and then exit the cell 104 of the spreadsheet 100 so that the result based on the part of the formula is calculated and displayed to the user. When a user is constantly moving in and out of a cell 104 while editing the formula to check accuracy of each sub-part, the process can become cumbersome.

For especially complex formulas, a common practice is to split the formula across several cells, with one "master cell" pulling the sub-parts of the formula together using cell references. This is inefficient and cumbersome because this method requires time to set up the formula due to extraneous navigation between cells and human memory load for the user to remember which cells hold which sub-part of the formula.

Figure 2:
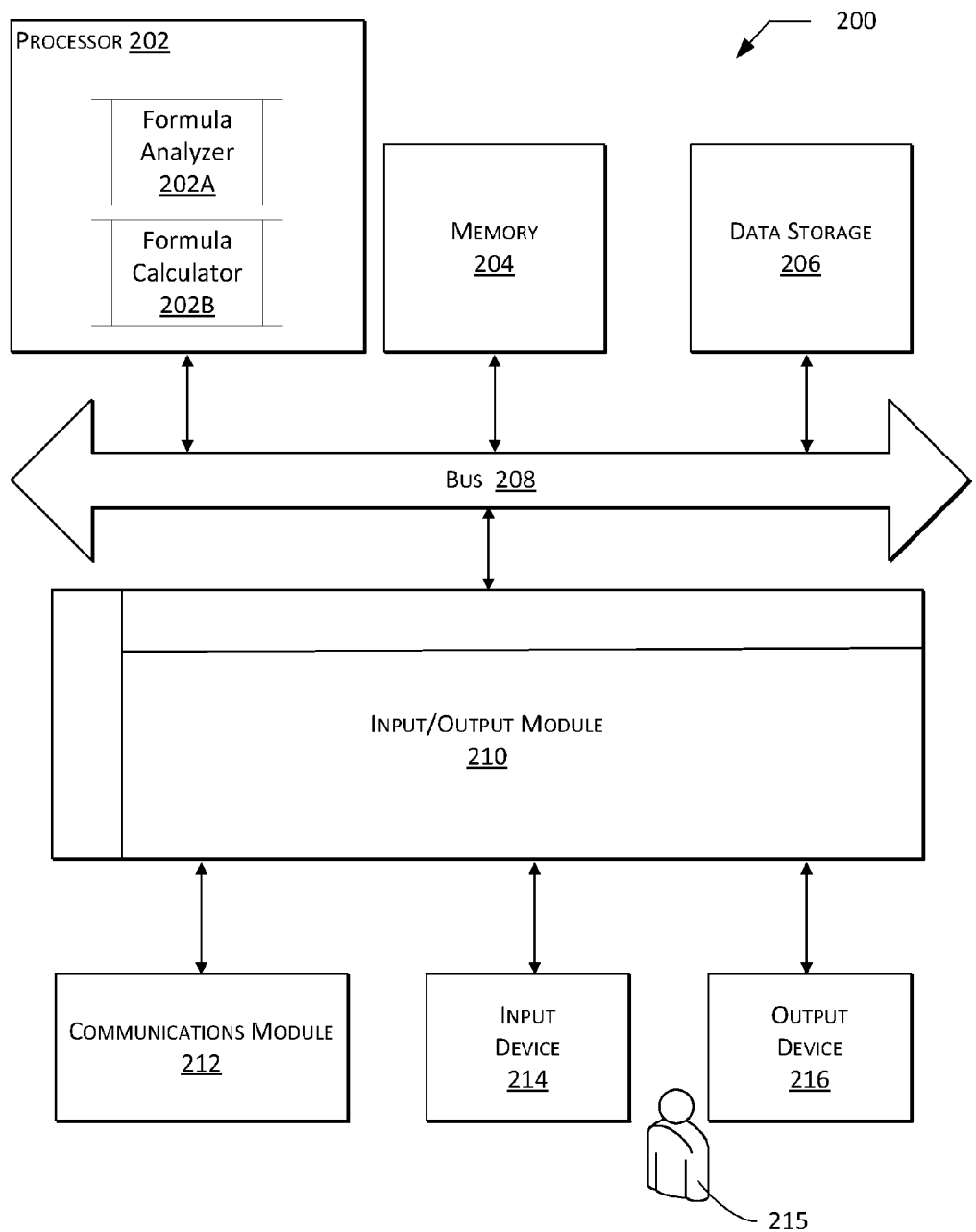
FIG. 2 is a high-level block diagram of example computer architecture, in which methods for editing a formula can be employed in accordance with one or more implementations described herein.

FIG. 2 is a high-level block diagram of example computer architecture in which methods for editing a formula can be employed. The computer system 200 can include, in addition to hardware, computer-executable instructions stored in memory 204. A bus 208 can couple the memory 204 for storing information and instructions executable by processor 202. The processor 202 can includes a formula analyzer 202A and a formula calculator 202B. The formula analyzer 202A and formula calculator 202B are described in detail below. Special purpose logic circuitry can supplement or incorporate the processor 202 and the memory 204.

The instructions can be stored in the memory 204 and implemented in one or more computer program products. Computer program products can be one or more modules of computer program instructions encoded on a computer-readable medium for execution by, or to control the operation of, the computer system 200. Memory 204 can store temporary variable or other intermediate information during execution of instructions executable by the processor 202.

The computer system 200 can further include a data storage device 206 coupled to the bus 208. The data storage device 206 stores information and instructions. An input/output module 210 can couple computer system 200 to various devices. The input/output module 210 can be any input/output module. Examples of input/output modules 210 include data ports such as universal serial bus (USB) ports. The input/output module 210 can connect to a communications module 212. Examples of communications modules 212 include networking interface cards, such as Ethernet cards and modems.

The input/output module 210 can also connect to a number of devices, such as an input device 214 and/or an output device 216. Examples of input devices 214 include a keyboard and a pointing device such as, for example, a mouse, by which a user 215 can provide input to the computer system 200. Examples of output devices 216 include display devices such as, for example, a liquid crystal display (LCD) monitor for displaying information to the user 215.

According to one aspect, the methods described here for editing a formula can be implemented using the computer system 200 in response to processor 202 executing one or more sequences of one or more instructions contained in memory 204. Another machine-readable medium, such as data storage device 206, can read such instructions into memory 204. Execution of the sequences of instructions contained in memory 204 can cause processor 202 to perform the described method steps.

The computing device 200 can take many forms such as a tablet, laptop, desktop, workstation, personal digital assistant, cellular telephone, smartphone, server, blade server, mainframe, or other device in communication with or having an input device 214, output device 216, and processing capability. The components shown here, their connections and relationships, and their functions, are meant to be examples, and are not meant to limit the method for editing a formula described and/or claimed in this document.

Referring now to FIGS. 3-9, details of example spreadsheets are shown in which techniques for editing a formula can be employed in accordance with one or more implementations described herein.

Figure 3:
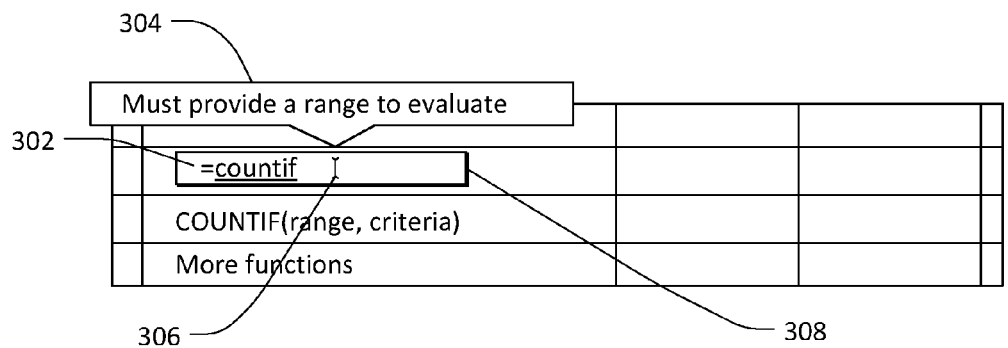
FIG. 3 is an example spreadsheet detail in which methods for editing a formula can be employed in accordance with one or more implementations described herein.

FIG. 3 is an example spreadsheet detail including an incomplete spreadsheet text string 302 in a cell 308. The cell 308 can be opened by moving a pointer 306 to hover over the cell 308 and clicking or double-clicking the cell 308 or by providing any other indication to open the cell 308. A text string 302 can be received by the cell 308, for example, in response to a user typing the text string 302 into the cell 308. While the user types the text string 302 into the cell 308, a formula analyzer 202A can parse the text string 302 to determine whether alphanumeric text, a numeric value, or a formula is present in the cell 308. If a formula is detected, the formula analyzer 202A can compare the partial formula against spreadsheet functions to determine which, if any, spreadsheet functions are being used within the formula.

In FIG. 3, the text string 302 includes the spreadsheet function COUNTIF. This function counts the number of cells within a range that meet a given criteria. For a proper entry, the COUNTIF function must include a range of cells from which the user wants to count cells and a criteria in the form of a number, expression, cell reference, or text that defines which cells will be counted. The proper format for this function is "COUNTIF(range,criteria)." In this example, the COUNTIF function does not yet include a range or criteria, so the formula analyzer 202A can supply a hint 304, or message: "Must provide a range to evaluate" to the user. This hint 304 describes the formula error, and can appear on the display whenever the pointer 306 is in proximity to the text string 302.

A formula can be composed of many spreadsheet functions or none at all. A formula can be created from numbers (e.g. "=5"), basic operators (e.g. "=5+4"), strings (e.g. "="hello""), functions (e.g. "=SUM(1, 2)") or combinations thereof (e.g. "=SUM(1, 2+3, SUM(4, 5, 6))"). Once spreadsheet functions are identified, the formula analyzer 202A can attempt to calculate sub-values for various sub-portions, or terms, that make up the spreadsheet functions. Some sub-values are able to be calculated while other sub-values cannot be calculated due to some formula error.

Examples of formula errors can include an incomplete formula, a missing character within the formula, unexpected text within a function, a missing function, and the like. If a formula error is found by the formula analyzer 202A, a message, or hint, can be displayed to the user regarding a method to fix the formula error. In certain circumstances, the sub-portion might contain more than one formula error. Because displaying all error hints at the same time could be distracting to the user, one formula error at a time can be displayed. This implementation can include a prioritization of formula errors, such that the formula analyzer 202A can decide the hierarchy of formula errors to display.

In some implementations, if there is a formula error, the formula error can be highlighted (e.g., by underlining) The hint about how to fix the formula error can be displayed if the user hovers the pointer over the highlighted error. When the display of the message, or hint, is based on the pointer's proximity to the formula error, the formula error can be shown immediately after a sub-portion, or term, of the spreadsheet function is entered, since the pointer will be adjacent to that sub-portion just entered.

Figure 4:
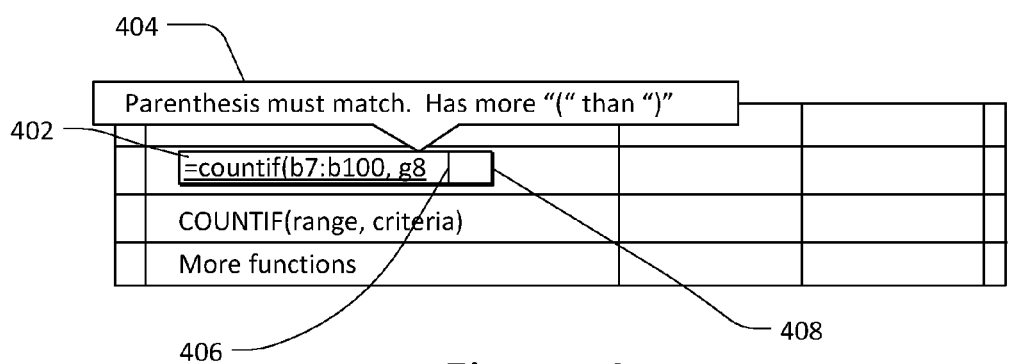
FIG. 4 is another example spreadsheet detail in which methods for editing a formula can be employed in accordance with one or more implementations described herein.

FIG. 4 is another example spreadsheet detail including an incomplete spreadsheet text string 402 in a cell 408. The cell 408 can be opened by a cursor 406 being placed within the cell 408. As a text string 402 is received in the cell 408, the formula analyzer 202A can parse the text string 402 to determine whether alphanumeric text, a numeric value, or a formula is present in the cell 408. In this example, the text string 402 includes the formula "COUNTIF(b7:b100, g8." This COUNTIF function includes a correct value for both the range and criteria components, but is missing a closing parenthesis. Hence, the formula analyzer 202A can supply the hint 404, or message: "Parenthesis must match. Has more '(' than ')'." The mis-location of the parenthesis cannot by its nature be localized, it is a global error, so the entire formula can be underlined, a type of highlighting, to denote the formula error.

In some implementations, the sub-value versus formula error calculation can be performed for all potential sub-values. The calculation does not stop when a formula error is encountered unless the formula error is a global error that prevents identification and calculation of a sub-value (e.g., a missing parenthesis). In these implementations, some sub-values can resolve to a value, while others might encounter a formula error. The attempted sub-value calculations that encounter a formula error can be underlined, and those that resolve to a value can have the value displayed in a message proximate to the sub-value when hovered over by a pointer or when in proximity to a cursor.

As another example, the following formula has at least two formula errors: "=a+SUM(2,". First, "a" is not a valid value for addition (it refers to an entire column). Second, there is an opening parenthesis "(" but not a closing parenthesis ")" in the formula. In this example, the second formula error can be displayed first based on proximity because the cursor will be located after the final comma, adjacent to the second formula error. If the user hovers the pointer over the "a," then the first formula error would be displayed. In this example, there can also be a third formula error based on the comma, indicating a missing parameter in the SUM function. One way to avoid overloading the user is to establish an order to the formula errors, with only one formula error displayed at a time.

Since displaying a formula error immediately upon entering the text string could distract the user, in one implementation a delay can be added. For example, without a delay, as soon as the user starts writing the function "SUM(", the "No Final Parentheses" error would show. The delay can be designed to give the user enough time to be able to enter additional detail of the formula before an error message is displayed, if not the entire formula. When feasible, the error hint can be localized to the portion, or term, of the text string that the formula error affects. Because sub-parts, terms, and sub-portions are recalculated continuously, formula errors are identified quickly and, when feasible, localized.

Figure 5:
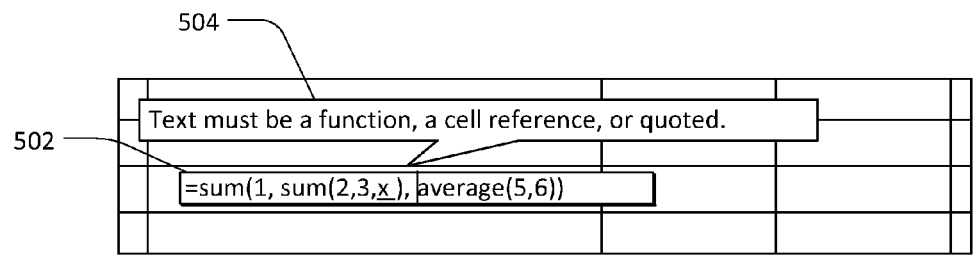
FIG. 5 is another example spreadsheet detail in which methods for editing a formula can be employed in accordance with one or more implementations described herein.
Figure 6:
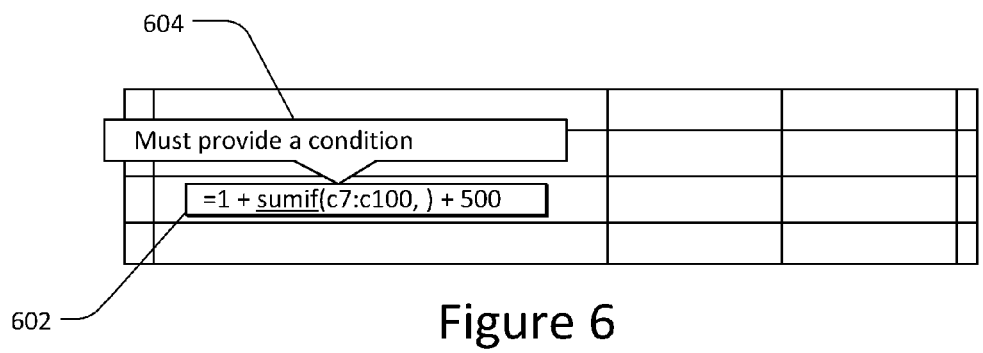
FIG. 6 is another example spreadsheet detail in which methods for editing a formula can be employed in accordance with one or more implementations described herein.

FIGS. 5 and 6 are additional example spreadsheet details related to portions of interest. A portion of interest is an area of the formula, or a term of the formula, that a user can select or indicate in some way. Example indications or selections of portions of interests include a user placing a cursor within a region of a formula, a user hovering a mouse pointer over a region of a formula, a user clicking on a region within a formula, or a user entering a delimiter within a formula. A delimiter can indicate the beginning or ending of a sub-portion or term of a formula, for example, by use of a parenthesis or a comma. By default, the portion of interest selected can be the location where a user is actively typing (often the end of the formula), since by virtue of text entry the cursor is positioned at the location where a user is typing within a cell.

Referring to FIG. 5, the spreadsheet functions SUM and AVERAGE are used in the example formula 502 "=SUM(1, SUM(2,3,x), AVERAGE(5,6))." The SUM function adds the values within the cell or the numbers specified in a range of cells. The AVERAGE function returns the average (arithmetic mean) of the numbers entered into the cell or the numbers specified in a range of cells. If unexpected text, in this case the letter "x," is entered within a function, then a message 504 can be displayed: "Text must be a function, a cell reference, or quoted." In contrast to the example shown in FIG. 4, which by its nature could not be localized, the unexpected text within the function, "x," can be underlined.

Referring to FIG. 6, the spreadsheet function SUMIF is used in the example formula 602 "=1+SUMIF(c7:c100,)+500." The SUMIF function adds the values within the cells specified by a given criteria. The proper format for the SUMIF function is "SUMIF(range,criteria,sum_range)." Range refers to the range of cells that the user wants evaluated by criteria. Criteria refer to the form of a number, expression, or text defining which cells will be added. "SUM_range" refers to the actual cells to add if the cells in the range specified match the criteria. In FIG. 6, the criteria, or condition is missing. Hence, the message 604 "Must provide a condition" can be displayed. This message 604, or hint, can be localized to the extent that the entire formula is not underlined, just the SUMIF function.

Figure 7:
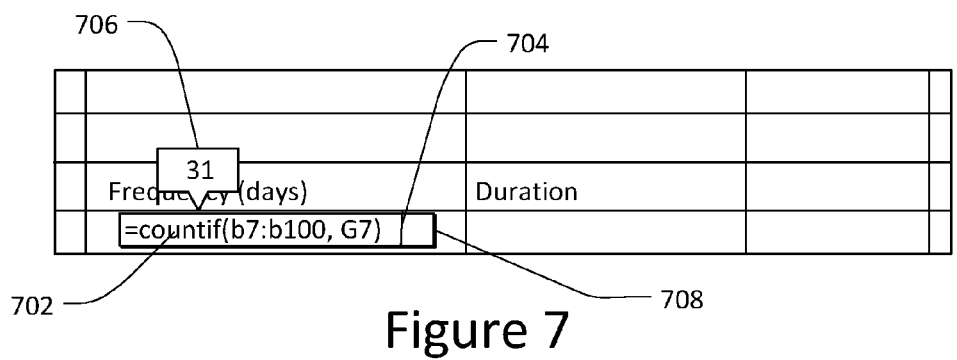
FIG. 7 is another example spreadsheet detail in which methods for editing a formula can be employed in accordance with one or more implementations described herein.
Figure 8:
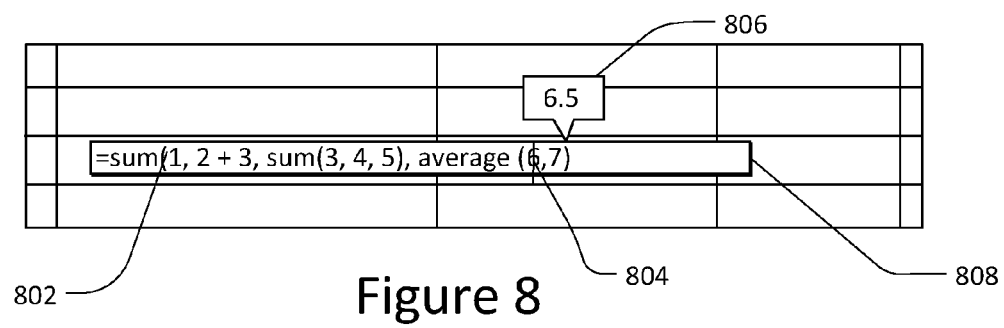
FIG. 8 is another example spreadsheet detail in which methods for editing a formula can be employed in accordance with one or more implementations described herein.
Figure 9:
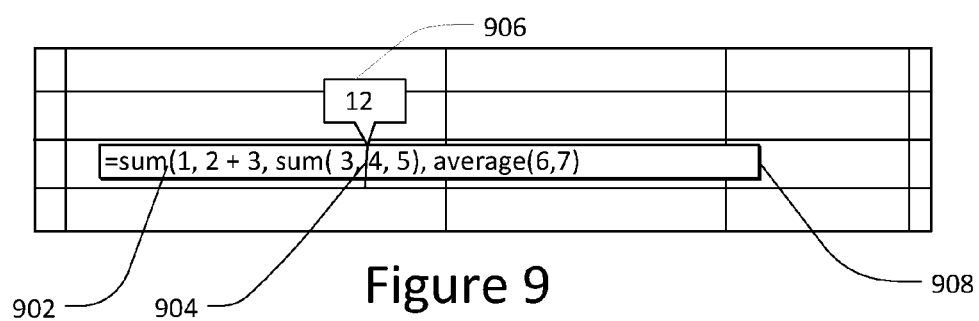
FIG. 9 is another example spreadsheet detail in which methods for editing a formula can be employed in accordance with one or more implementations described herein.

FIGS. 7-9 are additional example spreadsheet details related to calculating sub-values of a formula. If no errors are present in the parsed text string, and a formula is detected in the parsed text string, the formula calculator 202B can calculate at least one sub-value for the formula, generate a message regarding at least one sub-value, and send the message including the calculation to the display.

FIG. 7 shows the spreadsheet function COUNTIF used in the example formula 702 "=COUNTIF(b7:b100, G7)" present in the cell 708. There are no errors present in the parsed text string in this example. The formula calculator 202B described in FIG. 2 can thus be employed to determine the result of the formula 702. The formula calculator 202B can be configured such that, if the formula is complete, the entire formula value is displayed. For example, in FIG. 7, the formula calculator 202B can calculate a complete result of the formula based on the COUNTIF function, to produce result 706 having the value "31." The result 706 can be displayed to the user simultaneously with completion of the entry of the text string 702 into the cell 708 of the spreadsheet application. The result 706 can also be based on proximity of the cursor 704 to the text string, or on a pointer hovering over the text string.

FIGS. 8 and 9 show the spreadsheet function SUM used in the example formula 802, 902 "=SUM(1, 2+3, SUM(3, 4, 5), AVERAGE(6, 7))" as shown in cells 808 and 908. Hovering over, or placing the cursor in proximity to, the first instance of the function "SUM" can produce a message with the result 24.5 (not shown). Hovering over, or placing the cursor 804 in proximity to, the sub-portion or term "AVERAGE (6, 7)" produces a message 806 with the result "6.5." Hovering over, or placing the cursor in proximity to, the sub-portion or term "2+3" produces a message with the result "5" (not shown). Finally, hovering over, or placing the cursor 904 in proximity to, the sub-portion or term "SUM(3, 4, 5)" produces a message 906 with the result "12."

As another example, consider the formula "=1+2/3* (4−2)." As with the previous examples, hovering over "(4−2)" can produce a message with the result "2." However, it is not possible to calculate the sub-value of "3*(4" in this formula, because the order of operations precludes the sub-value from being used in the final calculation. In this way, only logical sub-values based on proper order of operations are displayed. Also, hovering over "1" would show the entire formula value since the addition is only calculable after the division, multiplication, and parentheses-enclosed subtraction are calculated based on order of operations.

In the methods for editing formulas described here, order of operations can be applied to calculate as many sub-portions or terms of a formula as possible, even in the presence of errors. Once each sub-portion or term of a formula is calculated, the resulting values can be combined to calculate sub-values, or results, which can be sent as messages to a display.

Some of the sub-values will fail to be calculated because of errors. Failed calculations can direct the formula analyzer 202A to determine the localization of formula errors.

Figure 10:
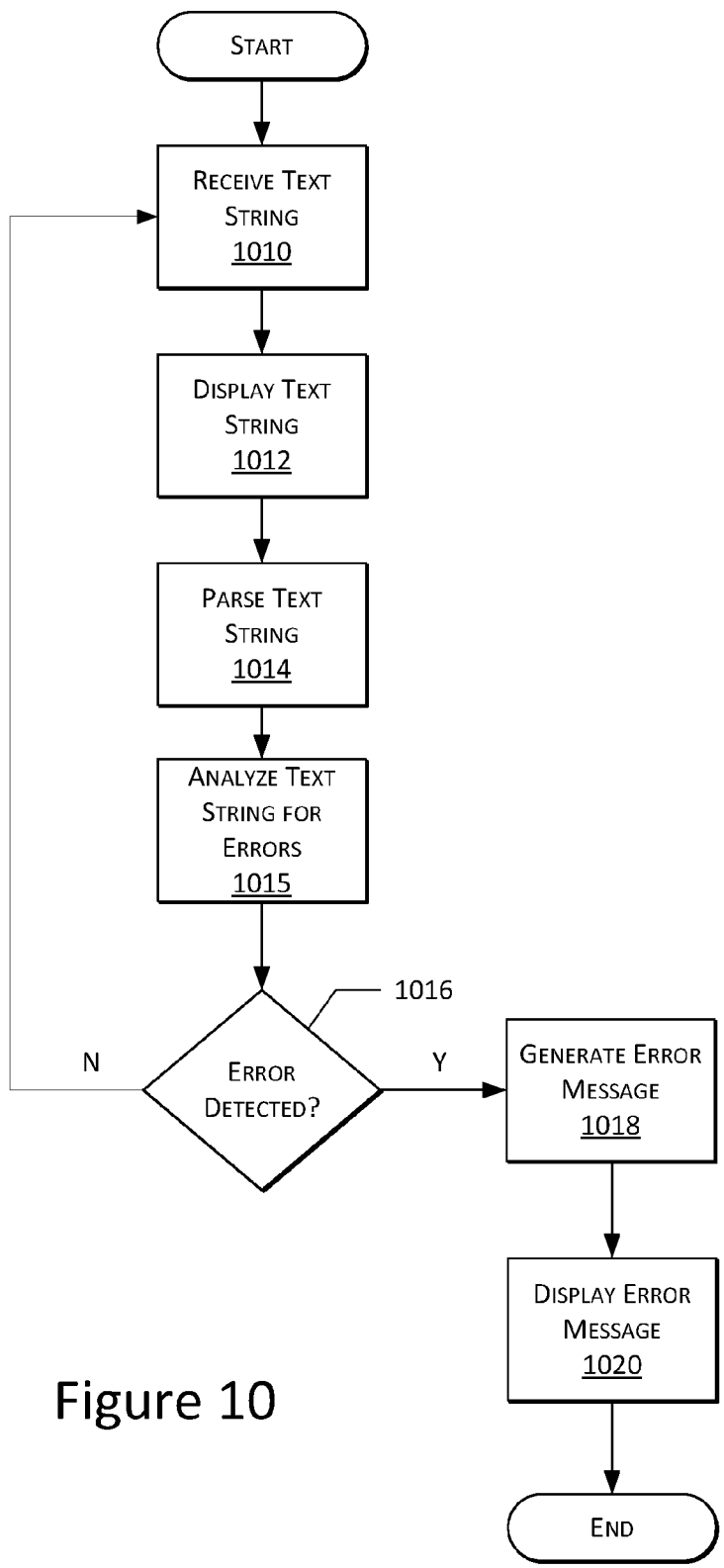
FIG. 10 is a flow chart showing an example of editing a formula in accordance with one or more implementations described herein.

FIG. 10 is a flow chart showing an example method of editing a formula. In step 1010, the method begins with receiving a text string including formula information. The text string can be received through an input device, such as a keyboard, can be pre-populated in a cell of a spreadsheet, can be a reference to external data in a tabular data-analysis application, or can be received in any other method. In step 1012, the text string can be sent to a display. The display can be part of the computing-device which is operating the data-analysis application, or can be any other type of external display in communication with the computing device.

In step 1014, the received text string can be parsed. Parsing the text string can include analyzing the text string to determine structure, for example, whether alphanumeric text, a numeric value, or a formula is present within the text string. In step 1015, the text string can be analyzed to identify any formula errors. In decision block 1016, the text string is reviewed to determine if any formula errors have been detected. If no formula errors are detected, the method returns to step 1010, awaiting additional text strings or continuation of the current text string. If a formula error is detected, a message can be generated pertaining to the formula error in step 1018. Once the error message is generated, the error message can be sent to the display in step 1020, and the process ends.

The error message can be displayed at the same time that the text string is being displayed. The error message can also be generated and sent to the display in response to the selection of a term, or portion, within the analyzed text string. For example, a term can be selected when a cursor is located within or proximate to the text string, a pointer is hovering over a term or portion of the text string, or a delimiter, such as a comma or parenthesis, is present within a term or portion of the text string. The error message can also include a hint regarding a suggested correction for the formula error. Example hints include those shown in FIGS. 3-6 described above. Displaying the error message can include not only a textual hint regarding a suggested correction, but also highlighting the error itself within the text string. Highlighting can include underlining the sub-portion of the formula where the formula error is present, changing a color displayed in connection with the formula error to denote a sub-portion of interest, or any other method of indication.

Figure 11:
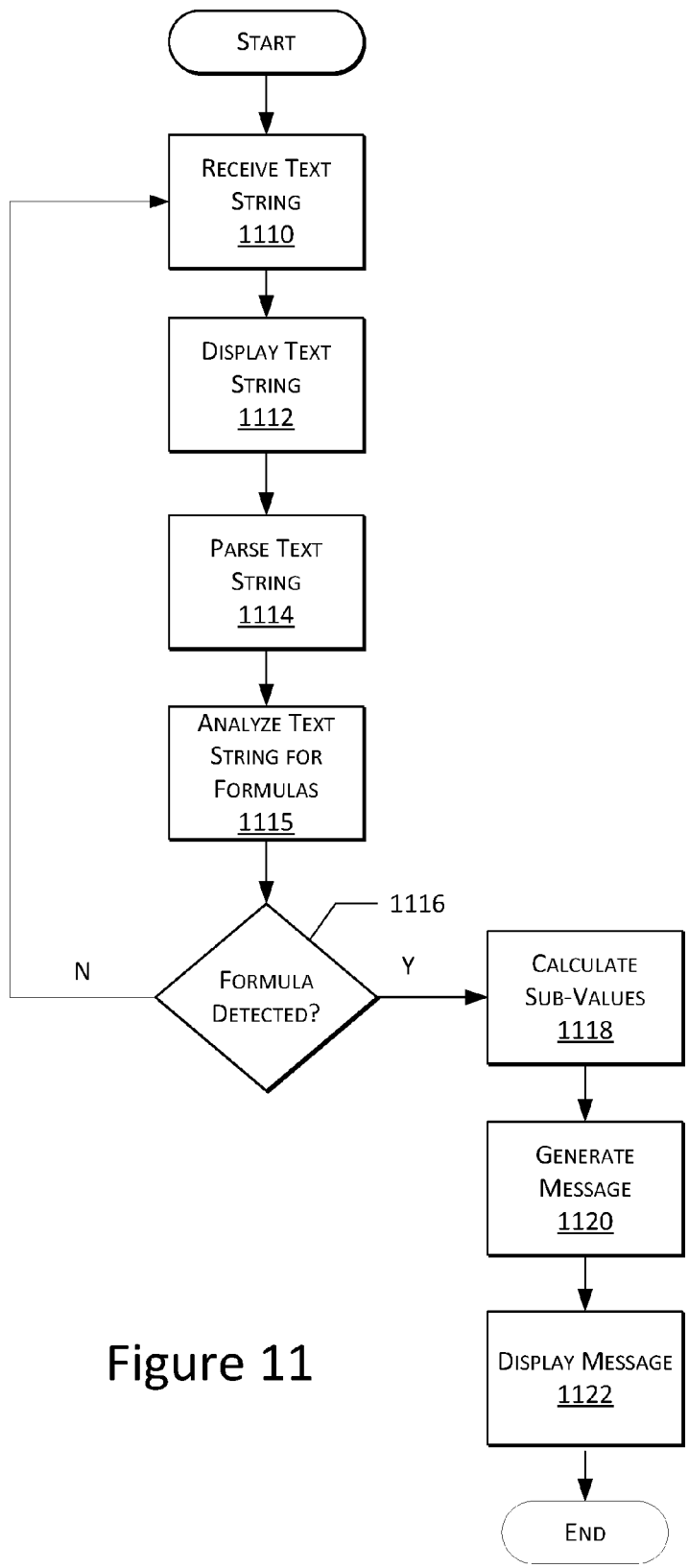
FIG. 11 is a flow chart showing an example of editing a formula in accordance with one or more implementations described herein.

FIG. 11 is a flow chart showing an example method of editing a formula. In step 1110, the method begins with receiving a text string including formula information. The text string can be received through an input device, such as a keyboard, can be pre-populated in a cell of a spreadsheet, can be a reference to external data in a tabular data-analysis application, or can be received in any other method. In step 1112, the text string can be sent to a display. The display can be part of the computing-device which is operating the data-analysis application, or can be any other type of external display in communication with the computing device.

In step 1114, the received text string can be parsed. Parsing the text string can include analyzing the text string to determine structure, for example, whether alphanumeric text, a numeric value, or a formula is present within the text string. In step 1115, the text string can be analyzed to identify a formula present in the text string. In decision block 1116, the text string is reviewed to determine if a formula is detected. If no formula is detected, no sub-values are calculated, and the method returns to step 1110 awaiting additional text strings or continuation of the current text string. If at least part of a formula is detected, at least one sub-value can be calculated in step 1118. Additionally, if a complete formula is detected, e.g. a formula without missing parts or formula errors, the complete result of the formula can also be calculated. A message can be generated pertaining to a sub-value or complete result of the formula in step 1120. Once the message is generated, the message can be sent to the display in step 1122, and the process ends.

The message pertaining to a sub-value or complete result can be displayed at the same time that the text string is being displayed. The message can also be generated and sent to the display in response to the selection of a term, or portion, within the analyzed text string. For example, a term can be selected when a cursor is located within or proximate to the text string, a pointer is hovering over a term or portion of the text string, or a delimiter, such as a comma or parenthesis, is present within a term or portion of the text string. The message can include the result of a sub-value or the result of the complete formula. Example results include those shown in FIGS. 7-9 described above. Displaying the message can include not only displaying a result, but also highlighting the sub-portion or term of interest, if any, within the text string. Highlighting can include underlining the sub-portion of the formula where the result is calculated, changing a color on the display to denote a sub-portion or term of interest, or any other method of indication.

With these methods for editing a formula, it is possible to enter a complete, complex formula into one cell all at one time, while still allowing for examination of the sub-parts of the formula in isolation. The sub-parts, sub-portions, or terms can be calculated based on order of operations and the result of each sub-part or term can be viewed either in the form of a result or a formula error. Giving a user the ability to review the sub-parts of a formula using order of operations and sub-part results in this way can help the user identify semantic problems that are causing incorrect evaluations.

When used herein, the term spreadsheet includes other computer applications having similar functionality. Other types of software that also enter formulas or otherwise check the content of the text strings against rules could implement the methods described here without departing from the scope and spirit of the examples. Examples include equation editors, calculator software, word processors (which might display a formula as part of text content), source code editors, and the like.

In addition, the implementations described herein are not inherently related to any particular hardware or other apparatus. The methods for formula editing can be controlled through either hardware or through computer programs installed in computer storage and executed by the processors of servers. One or more processors in a multi-processing arrangement also can be employed to execute the sequences of instructions.

When embodied as hardware, the hardware can be specially constructed for the required purposes or can include a general-purpose computer selectively activated or reconfigured by a computer program stored on a computer-readable medium. In addition, the implementations described here are not limited to any particular programming language.

The techniques can be implemented using a single computer or a network of computers, including cloud-based computing. The computers can be server-class computers including one or more high-performance central processing units (CPUs), memory such as main memory and computer-readable persistent storage, network interfaces, peripheral interfaces, and other well-known components.

The computers can run an operating system. Various types of operating systems and computers can be used, and it is expected that more powerful computers developed in the future can be configured in accordance with the implementations described here.

The term computer-readable media includes computer-storage media. Examples include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any other type of media suitable for storing electronic instructions.

Furthermore, at times arrangements of operations have been referred to as modules or by functional names, without loss of generality. The term 'module' refers to computational logic for providing the specified functionality. The division of functionality between components, the naming of modules, components, attributes, data structures or any other programming or structural aspect is merely exemplary, and not mandatory or significant. In addition, other implementations can lack modules and/or distribute the described functionality among modules in a different manner. Functions performed by a component can instead be performed by multiple components, and functions performed by multiple components can instead be performed by a single component.

What is claimed is:

1. A computer-implemented method for editing a formula, the method comprising:
   receiving a text string including formula information;
   while the text string is being received, parsing the received text string and analyzing the parsed text string for global formula errors, localized formula errors, and a formula including formula sub-parts wherein analyzing occurs after a threshold time delay;
   in response to detecting a global formula error, generating an indication for the formula including the global formula error, generating a message including a suggested correction for the global formula error, and sending both the indication for the formula and the message including the suggested correction for the global formula error to a display;
   in response to detecting a localized formula error, generating an indication for the formula sub-part including the localized formula error, generating a message including a suggested correction for the localized formula error, and sending both the indication for the formula sub-part and the message including the suggested correction for the localized formula error to the display;
   in response to detecting a formula sub-part, calculating a sub-value for the formula sub-part, generating a message including the sub-value, and sending the message including the sub-value to the display; and
   if neither a global formula error nor a localized formula error is detected, calculating a value for the formula, generating a message including the value, and sending the message including the value to the display.

2. The method of claim 1,
   wherein sending the message including the suggested correction for the localized formula error to the display occurs in response to selection of the formula sub-part including the localized formula error.

3. The method of claim 2 wherein the selection of the formula sub-part occurs in response to a delimiter being proximate to the formula sub-part in the text string containing the localized formula error.

4. The method of claim 2 wherein the selection of the formula sub-part occurs in response to a cursor being proximate to the formula sub-part in the text string containing the localized formula error.

5. The method of claim 2 wherein the selection of the formula sub-part occurs in response to a pointer hovering over the formula sub-part in the text string containing the localized formula error.

6. The method of claim 1 wherein the message including the suggested correction for the localized formula error includes highlighting the formula sub-part within the text string containing the localized formula error.

7. A computer-implemented method for editing a formula, the method comprising:
   receiving a text string including formula information;
   while the text string is being received, parsing the received text string and analyzing the parsed text string for global formula errors, localized formula errors, and a formula including formula sub-parts, wherein analyzing occurs after a threshold time delay for receiving additional formula information;
   in response to detecting a global formula error that persists beyond the threshold time delay, generating a message including a suggested correction for the global formula error and sending the message including the suggested correction for the global formula error to a display;
   in response to detecting a localized formula error that persists beyond the threshold time delay, generating a message including a suggested correction for the localized formula error and sending the message including the suggested correction for the localized formula error to the display;
   in response to detecting a formula sub-part, calculating a sub-value for the formula sub-part, generating a message including the sub-value, and sending the message including the sub-value to the display; and
   if neither a global formula error nor a localized formula error is detected, calculating a value for the formula, generating a message including the value, and sending the message including the value to the display.

8. The method of claim 7,
   wherein sending one of the message including the at least one sub-value for the formula sub-part and the message including the suggested correction for the localized formula error to the display occurs in response to selection of the formula sub-part.

9. The method of claim 8 wherein the selection of the formula sub-part occurs in response to a delimiter being proximate to the formula sub-part in the text string containing one of the formula sub-value and the localized formula error.

10. The method of claim 8 wherein the selection of the formula sub-part occurs in response to a cursor being proximate to the formula sub-part in the text string containing one of the formula sub-value and the localized formula error.

11. The method of claim 8 wherein the selection of the formula sub-part occurs in response to a pointer hovering over the formula sub-part in the text string containing one of the formula sub-value and the localized formula error.

12. The method of claim 8 wherein at least two sub-values are calculated, and the formula sub-part selected within the analyzed text string includes one of the at least two sub-values.

13. The method of claim 7 further comprising:

in response to selection of a formula sub-part within the formula, sending the message pertaining to the result of the formula to the display.

14. A computer-readable medium having processor-executable program instructions adapted to be executed to implement a method for editing a formula, the method comprising:

receiving a text string including formula information;

while the text string is being received, parsing the received text string and analyzing the parsed text string for global formula errors, localized formula errors, and a formula including formula sub-parts, wherein analyzing occurs after a threshold time delay for receiving additional formula information;

in response to detecting a global formula error that persists beyond the threshold time delay, generating a message including a suggested correction for the global formula error and sending the message including the suggested correction for the global formula error to a display;

in response to detecting a localized formula error that persists beyond the threshold time delay, generating a message including a suggested correction for the localized formula error and sending the message including the suggested correction for the localized formula error to the display;

in response to detecting a formula sub-part, calculating a sub-value for the formula sub-part, generating a message including the sub-value, and sending the message including the sub-value to the display; and if neither a global formula error nor a localized formula error is detected, calculating a value for the formula, generating a message including the value, and sending the message including the value to the display.

15. The computer-readable medium of claim 14 wherein the method further comprises:

sending one of the message including the sub-value for the formula sub-part and the message including the suggested correction for the localized formula error to the display occurs in response to selection of the formula sub-part.

16. The computer-readable medium of claim 15 wherein at least two sub-values are calculated, and the formula sub-part selected within the analyzed text string includes one of the at least two sub-values.

17. The method of the computer-readable medium of claim 15 wherein the selection of the formula sub-part occurs in response to a delimiter being proximate to the formula sub-part in the text string containing one of the formula sub-value and the localized formula error.

18. The method of the computer-readable medium of claim 15 wherein the selection of the formula sub-part occurs in response to a cursor being proximate to the formula sub-part in the text string containing one of the formula sub-value and the localized formula error.

19. The method of the computer-readable medium of claim 15 wherein the selection of the formula sub-part occurs in response to a pointer hovering over the formula sub-part in the text string containing one of the formula sub-value and the localized formula error.

* * * * *